United States Patent
Lin

(10) Patent No.: US 9,686,639 B2
(45) Date of Patent: Jun. 20, 2017

(54) TRANSMISSION SYSTEM USING BLUETOOTH LOW ENERGY TECHNIQUE

(71) Applicant: Quanta Computer Inc., Taoyuan (TW)

(72) Inventor: I-Chin Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/141,789

(22) Filed: Apr. 28, 2016

(65) Prior Publication Data

US 2017/0099564 A1    Apr. 6, 2017

(30) Foreign Application Priority Data

Oct. 2, 2015  (TW) .............................. 104132487 A

(51) Int. Cl.
| | |
|---|---|
| H04B 7/00 | (2006.01) |
| H04W 4/00 | (2009.01) |
| H04H 20/38 | (2008.01) |
| H04L 29/12 | (2006.01) |
| H04L 29/06 | (2006.01) |
| H04W 76/02 | (2009.01) |

(52) U.S. Cl.
CPC ............ *H04W 4/008* (2013.01); *H04H 20/38* (2013.01); *H04L 61/6022* (2013.01); *H04L 69/22* (2013.01); *H04W 76/02* (2013.01)

(58) Field of Classification Search
CPC .................................................... H04W 4/008

USPC ................................................. 455/41.1–41.3
See application file for complete search history.

(56) References Cited

U.S. PATENT DOCUMENTS

| | | | |
|---|---|---|---|
| 2013/0165044 A1 | 6/2013 | Xie et al. | |
| 2014/0355517 A1* | 12/2014 | Reunamaki | H04W 8/005 370/328 |
| 2015/0172901 A1* | 6/2015 | Kasslin | H04W 4/008 370/328 |

OTHER PUBLICATIONS

Chinese language office action dated Sep. 14, 2016, issued in application No. TW 104132487.

* cited by examiner

*Primary Examiner* — Nay A Maung
*Assistant Examiner* — Angelica M Perez
(74) *Attorney, Agent, or Firm* — McClure, Qualey & Rodack, LLP

(57) ABSTRACT

A transmission system using the Bluetooth Low Energy is provided. The transmission system includes a broadcast device transmitting broadcast data, and a scanning device receiving the broadcast data and determining whether to execute a response action according to the broadcast data. The response action includes replying with request data to the broadcast device, and the broadcast device determines whether to transmit parameter data to the scanning device according to the request data in order to make the scanning device determine whether to further execute the response action. The parameter data is set according to the request data.

9 Claims, 6 Drawing Sheets

TRANSMISSION SYSTEM USING BLUETOOTH LOW ENERGY TECHNIQUE

CROSS REFERENCE TO RELATED APPLICATIONS

This Application claims priority of Taiwan Patent Application No. 104132487, filed on Oct. 2, 2015, the entirety of which is incorporated by reference herein.

BACKGROUND OF THE INVENTION

Field of the Invention

The present invention relates to a transmission system, and in particular to a transmission system using a Bluetooth Low Energy technique.

Description of the Related Art

In the application of the Bluetooth Low Energy (BLE) technique on the market so far, if it is necessary to interact with a device using the BLE technique (setting parameter, for example), this interaction normally is done by establishing a Bluetooth connection with the device and writing some characteristics in GATT service of the device. If the interaction is generated through the above Bluetooth connection method, then there might be some issues regarding the operation.

For example, the main function of the BLE beacon-type product is to continuously broadcast data. If the product is available to be connected through a Bluetooth connection, the BLE beacon-type product will lose its data-broadcast functionality after the Bluetooth connection is established; and someone could interrupt the broadcast function of the BLE beacon-type product by continuously connecting the product through the Bluetooth connection. Moreover, the amount of time needed to establish a Bluetooth connection might be excessive because of environmental factors, leading the operation time to be over the acceptable limit (especially as applied to a mobile beacon product).

BRIEF SUMMARY OF THE INVENTION

A transmission system using the Bluetooth Low Energy is provided. The transmission system comprises a broadcast device and a scanning device. The broadcast device transmits broadcast data. The scanning device receives the broadcast data and determines whether to execute a response action according to the broadcast data. The response action includes replying with request data to the broadcast device. The broadcast device determines whether to transmit parameter data to the scanning device according to the request data in order to make the scanning device determine whether to further execute the response action, and the parameter data is set according to the request data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
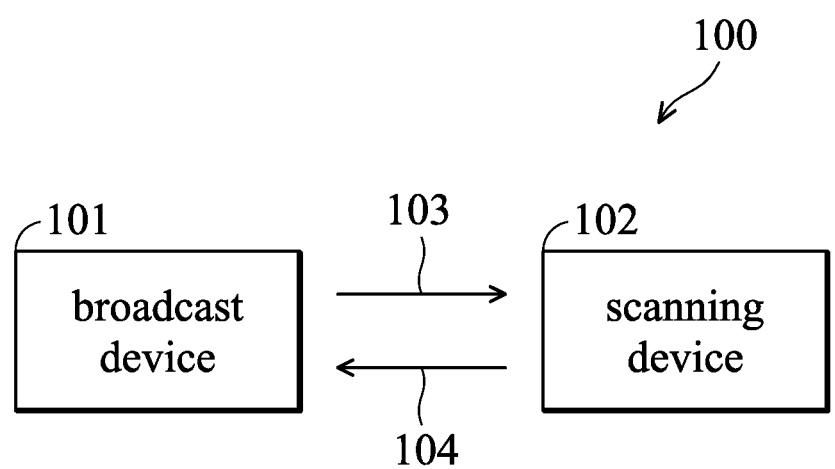
FIG. 1A is a block diagram of a transmission system using the BLE technique according to an exemplary embodiment.

FIG. 1A is a block diagram of a transmission system 100 using the BLE technique according to an exemplary embodiment. The transmission system 100 includes a broadcast device 101 and a scanning device 102. The broadcast device 101 periodically transmits broadcast data 103. After receiving the broadcast data 103, the scanning device 102 determines whether to reply with request data 104 to the broadcast device 101 according to the broadcast data 103. In some embodiments, the broadcast data 103 is the application of ADV_SCAN_IND defined in the specification of the BLE technique, and the request data 104 is the application of SCAN_REQ defined in the specification of the BLE technique. As per the operation described above, the broadcast device 101 and the scanning device 102 can interact with each other without establishing a Bluetooth (BT) connection. In some embodiments, when the transmission system 100 is operating, the transmission system 100 does not accept a connection request to avoid losing the broadcast function due to the BT connection being established by the connection request, wherein the connection request is CONNECT_REQ defined in the specification of the BLE technique.

Figure 1B:
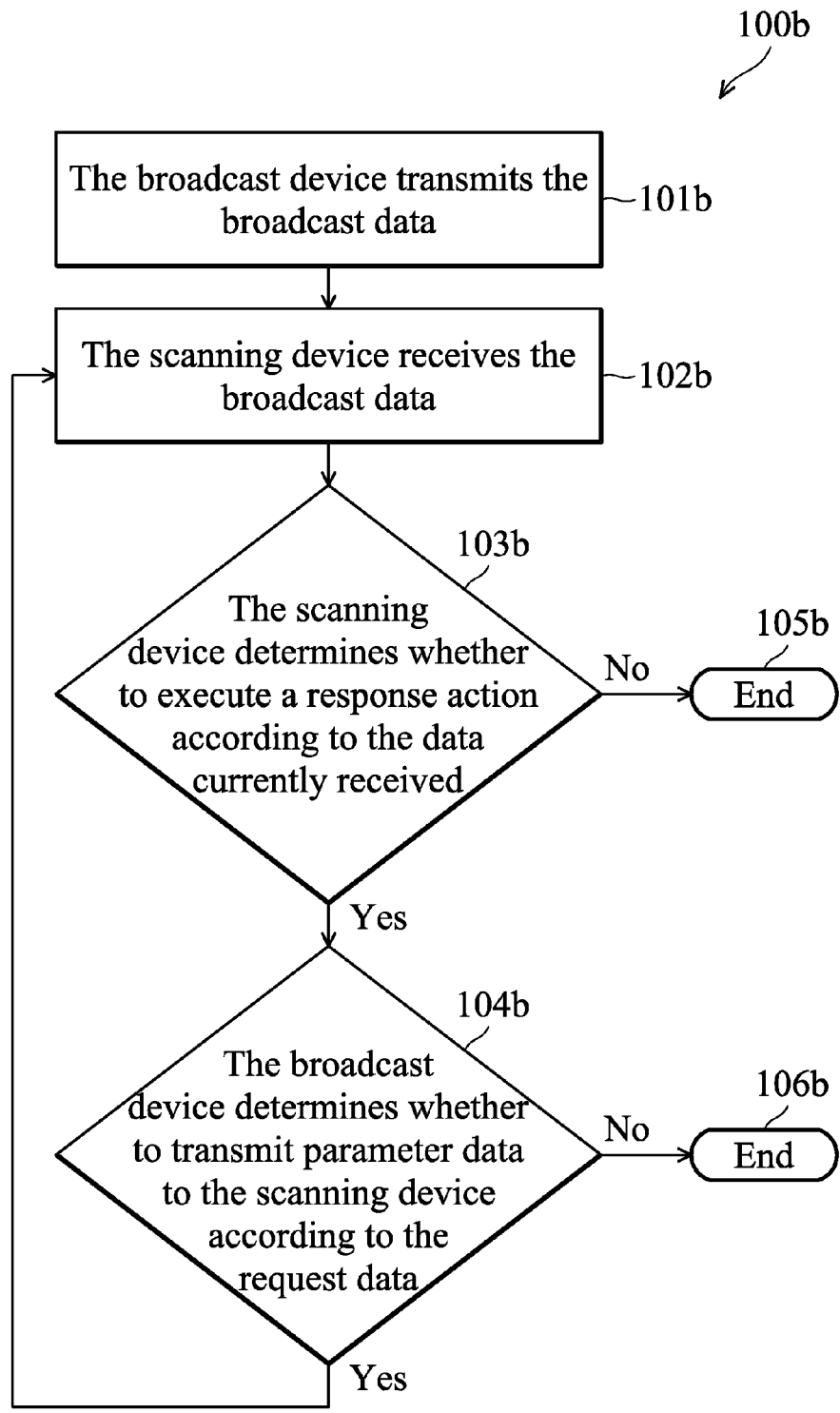
FIG. 1B is a flow chart of a transmission system using the BLE technique according to an exemplary embodiment.

The operation of transmission system 100 is shown as flow chart 100b in FIG. 1B, and the flow starts in step 101b. In the step 101b, transmission system 100 transmits the broadcast data 103 through the broadcast device 101. In step 102b, the scanning device 102 receives the broadcast data 103. In step 103b, the scanning device 102 determines whether to execute a response action according to the data currently received. The response action includes replying with request data 104 to the broadcast device 101. If the scanning device 102 sends the request data 104, the flow goes to step 104b, or if the scanning device 102 does not send the request data 104, the flow ends in step 105b. In the step 104b, the broadcast device 101 determines whether to transmit parameter data to the scanning device 102 according to the request data 104, and the parameter data is set according to the request data. If the broadcast device 101 transmits the parameter data, the flow returns to step 102b, causing the scanning device 102 to determine whether to further execute the response action according to the data received currently. If the broadcast device 101 does not transmit the parameter data, the flow ends in step 106b.

In some embodiments, the broadcast device 101 transmits the broadcast data 103, the parameter data and receives the request data 104 through a first transceiver (which is not shown in FIG. 1), executing the determination in step 104b through a first controller (which is not shown in FIG. 1). The scanning device 102 receives the broadcast data 103, the parameter data and transmits the request data 104 through a second transceiver (which is not shown in FIG. 1), executing the determination in step 103b through a second controller (which is not shown in FIG. 1).

Figure 2A:
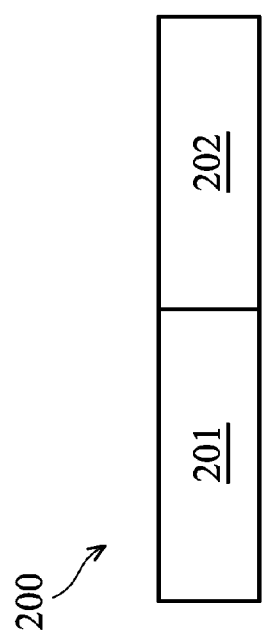
FIG. 2A is a payload of request data according to an exemplary embodiment.
Figure 2B:
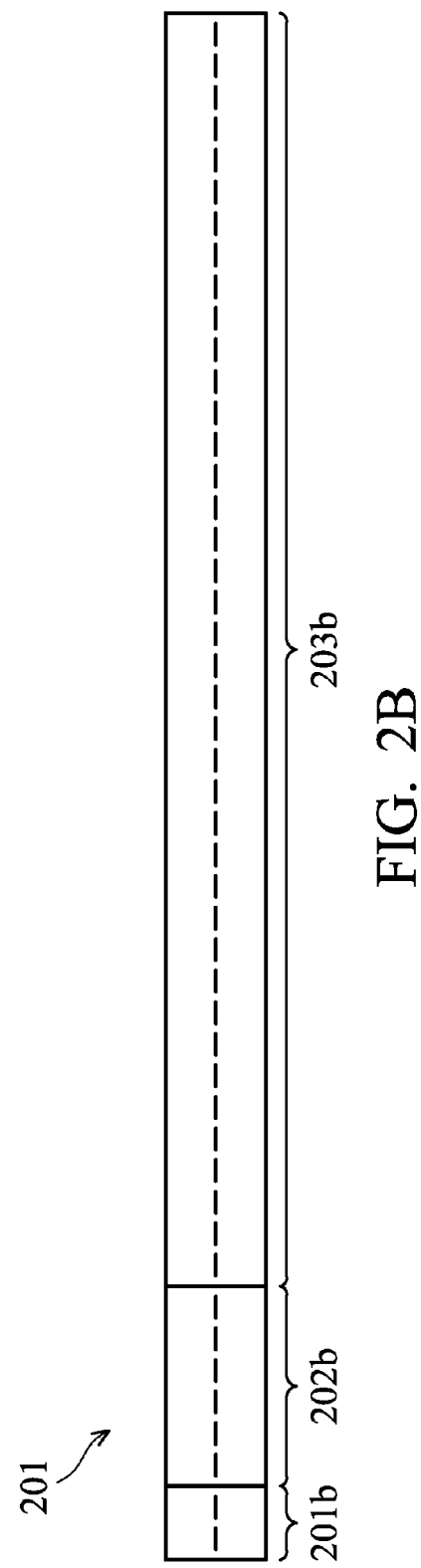
FIG. 2B is a first address of a payload according to an exemplary embodiment.

The request data described above includes a payload. FIG. 2A shows a payload 200 of the request data 104 in the transmission system 100. The payload 200 includes a first address 201 and a second address 202, and the bit numbers of the first address 201 and second address 202 are both 48 bits. In this embodiment, the content of the second address 202 is a MAC address of the broadcast device 101. The content of the first address 201 has a first data segment 201b with 2 bits, a second data segment 202b with 6 bits, and a third data segment 203b with 40 bits, as depicted in FIG. 2B. The content of the third data segment 203b is equal to the last 40 bits of the second address 202. The first data segment 201b represents the operating code of the request data 104, and the second data segment 202b represents the parameter code of the request data 104.

As mentioned in flow chart 100b, in step 104b, the action by which the broadcast device 101 determines whether to transmit the parameter data to the scanning device 102 is based on the content of the third data segment 203b. In this embodiment, the broadcast device 101 transmits the parameter data to the scanning device 102 when the broadcast device 101 determines that the content of the third data segment 203b of the request data 104 is equal to a portion of the content of the second address 202, and the bit locations of the portion of the content in the second address 202 correspond to the bit locations of the third data segment 203b in the first address 201.

In some embodiments, each bit number of the first data segment 201b, second data segment 202b, and third data segment 203b can be assigned freely, wherein the total bit number equals to 48 bits, and the arrangement order of the first data segment 201b, second data segment 202b, and third data segment 203b can also be assigned freely. In some embodiments, the content of the third data segment 203b can be set as any portion of the second address 202. In some embodiments, the broadcast device 101 transmits the parameter data to the scanning device 102 when the broadcast device 101 determines that the third data segment 203b of the request data 104 is equal to a predetermined data.

In this embodiment, the operating code of the request data 104 can let the broadcast device 101 execute an operation action, and the parameter code can set the parameters of the operation action. In this embodiment, the operation action is to set the parameter data, that is, the content of the parameter data is set according to the first data segment 201b and the second data segment 202b of the request data 104.

Figure 3:
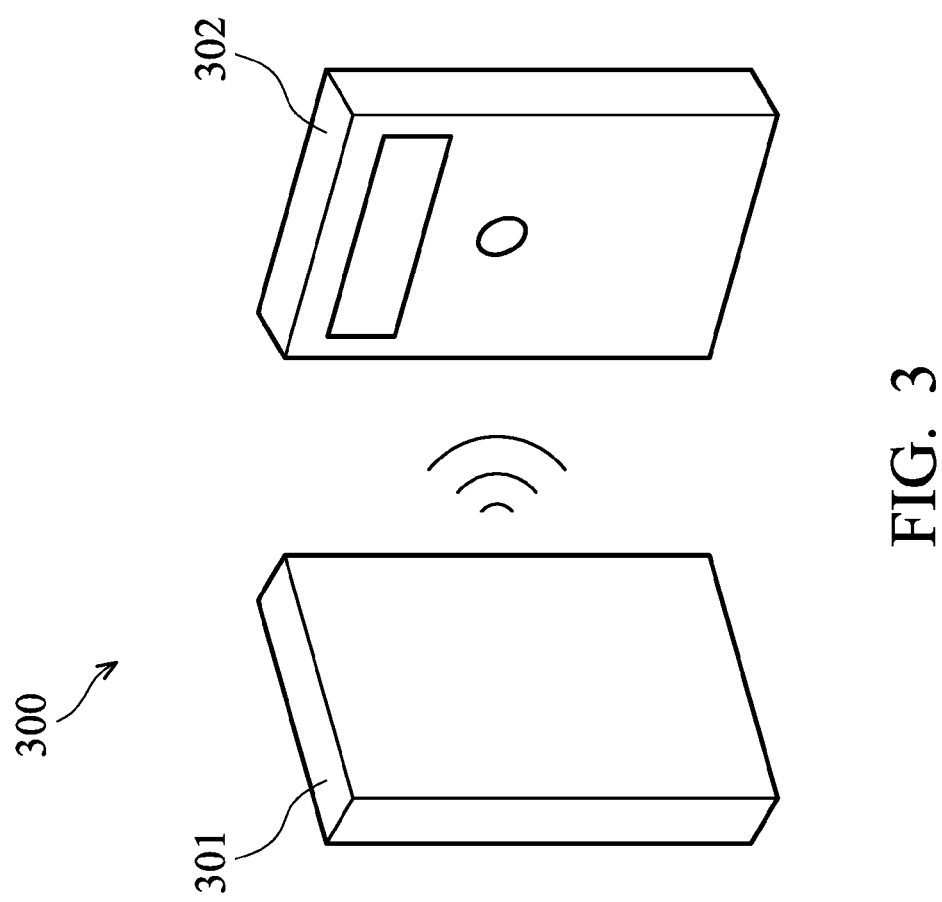
FIG. 3 is a schematic diagram of a transmission system using the BLE technique according to an exemplary embodiment.
Figure 4:
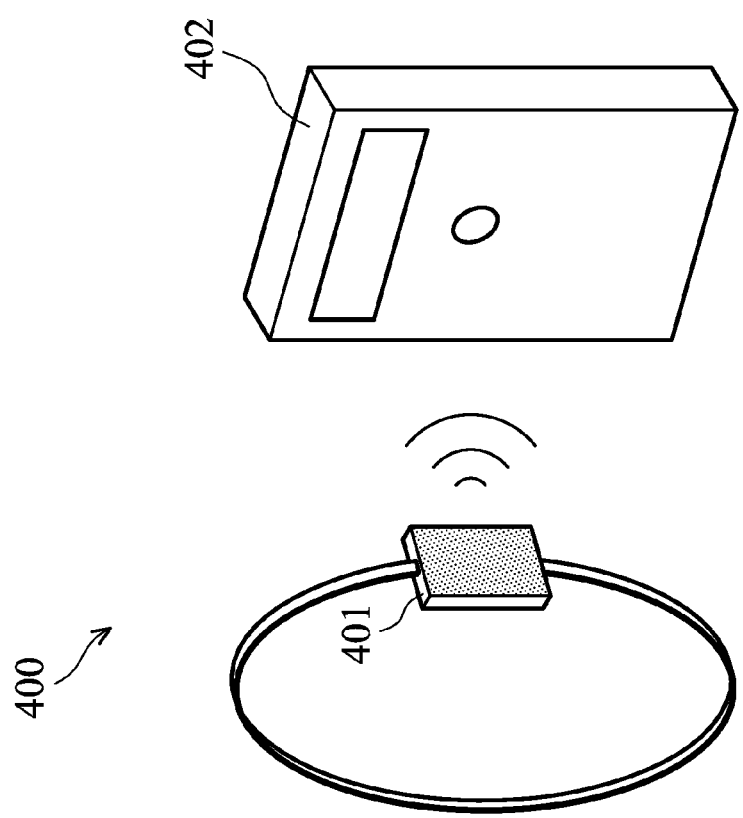
FIG. 4 is a schematic diagram of a transmission system using the BLE technique according to an exemplary embodiment.
Figure 5:
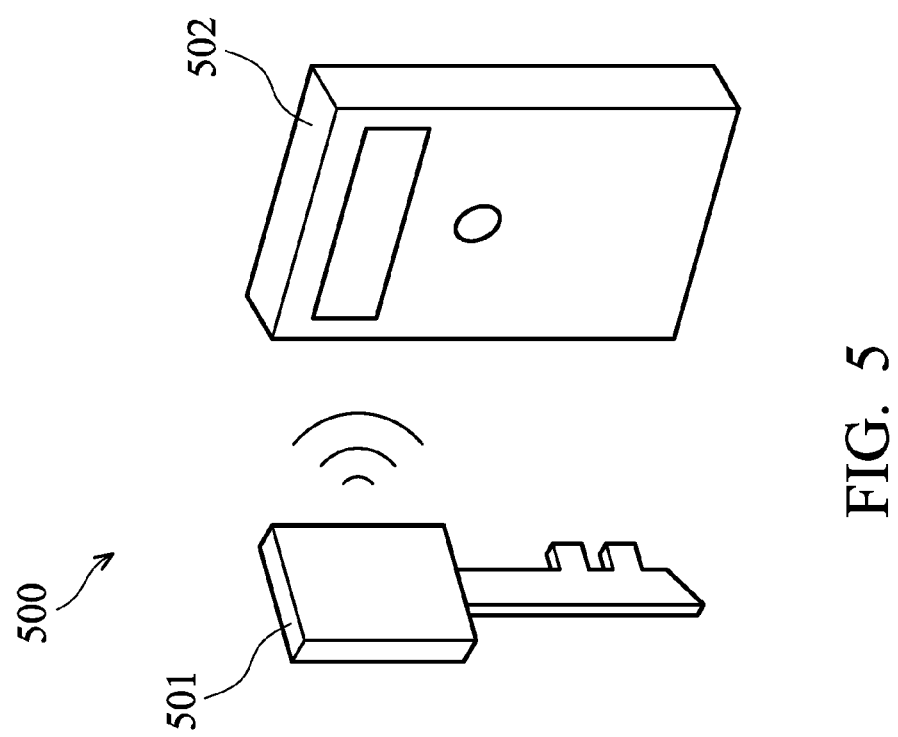
FIG. 5 is a schematic diagram of a transmission system using the BLE technique according to an exemplary embodiment.

The applications using the BLE technique described above can be applied to the embodiments described in FIG. 3 to FIG. 5. FIG. 3 is a schematic diagram of a transmission system 300 using the BLE technique according to an exemplary embodiment. An identification card 301 corresponds to the broadcast device 101, and the sensor 302 corresponds to the scanning device 102. During the operation of the transmission system 300, the identification card 301 periodically broadcasts an identification code corresponding to the broadcast data 103. When the sensor 302 receives the identification code, the sensor 302 determines whether the identification code belongs to a staff in a specific company. Based on the above determination, the sensor 302 determines whether to reply with request data corresponding to the request data 104 in order to request a password from the identification card 301. After the sensor 302 confirms that the identification code belongs to the specific company, the sensor 302 transmits the request data including a customized payload corresponding to the payload 200 to the identification card 301. The identification card 301 examines a third data segment of the customized payload after receiving the request data. After the identification card 301 confirms that the content of the third data segment of the request data is equal to a portion of the content of the second address of the request data, which represents that the request data corresponds to the identification card 301 the identification card 301 is informed according to a first data segment and a second data segment of the customized payload that the sensor 302 requests the password. After that, the identification card 301 transmits parameter data including the password to the sensor 302 through the broadcast communication. The sensor 302 replies with another request data including another customized payload to the identification card 301 in order to inform the identification card 301 of the examination result of the password (pass or fail) after receiving the parameter data.

FIG. 4 is a schematic diagram of a transmission system 400 using the BLE technique according to an exemplary embodiment. A wristband 401 corresponds to the broadcast device 101, and the sensor 402 corresponds to the scanning device 102. During the operation of the transmission system 400, the wristband 401 periodically broadcasts a room identification code corresponding to the broadcast data 103. When the sensor 402 receives the room identification code, the sensor 402 determines whether the room identification code belongs to a wristband of a specific hotel. Based on the above determination, the sensor 402 determines whether to reply with request data corresponding to the request data 104 in order to request a password from the wristband 401. After the sensor 402 confirms that the room identification code belongs to the wristband of the specific hotel, the sensor 402 transmits the request data including a customized payload corresponding to the payload 200 to the wristband 401. The wristband 401 examines a third data segment of the customized payload after receiving the request data. After the wristband 401 confirms that the content of the third data segment of the request data is equal to a portion of the content of the second address of the request data, which represents that the request data corresponds to the wristband 401 the wristband 401 is informed according to a first data segment and a second data segment of the customized payload that the sensor 402 requests the password. After that, the wristband 401 transmits parameter data including the password to the sensor 402 through the broadcast communication. The sensor 402 replies with another request data including another customized payload to the wristband 401 in order to inform the wristband 401 of the examination result of the password (pass or fail) after receiving the parameter data.

FIG. 5 is a schematic diagram of a transmission system 500 using the BLE technique according to an exemplary embodiment. A key 501 corresponds to the broadcast device 101, and the sensor 502 corresponds to the scanning device 102. During the operation of the transmission system 500, the key 501 periodically broadcasts an identification code corresponding to the broadcast data 103. When the sensor 502 receives the identification code, the sensor 502 determines whether the identification code matches a lock including the sensor 502. Based on the above determination, the sensor 502 determines whether to reply with request data corresponding to the request data 104 in order to request a password from the key 501. After the sensor 502 confirms that the identification code belongs to the lock, the sensor 502 transmits the request data including a customized payload corresponding to the payload 200 to the key 501. The key 501 examines a third data segment of the customized payload after receiving the request data. After the key 501 confirms that the content of the third data segment of the request data is equal to a portion of the content of the second address of the request data, which represents that the request data corresponds to the key 501, the key 501 is informed according to a first data segment and a second data segment of the customized payload that the sensor 502 requests the password. After that, the key 501 transmits parameter data including the password to the sensor 502 through the broadcast communication. The sensor 502 replies with another request data including another customized payload to the key 501 in order to inform the key 501 of the examination result of the password (pass or fail) after receiving the parameter data.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmission system using Bluetooth Low Energy comprising:
    a broadcast device, transmitting broadcast data; and
    a scanning device, receiving the broadcast data and determining whether to execute a response action according to the broadcast data;
    wherein the response action includes replying with request data to the broadcast device;
    wherein the broadcast device determines whether to transmit parameter data to the scanning device according to the request data in order to make the scanning device determine whether to further execute the response action;
    wherein the parameter data is set according to the request data;
    wherein the content of a payload of the request data in order comprises a first address and a second address;
    wherein the second address is a MAC address of the broadcast device;
    wherein the first address has a first data segment which is an operating code consisting of multiple bits, a second data segment which is a parameter code consisting of multiple bits and a third data segment consists of multiple bits which are a portion of the MAC address of the broadcast device;
    wherein the broadcast device transmits the parameter data which is set according to the first data segment and the second data segment to the scanning device when the broadcast device determines that the third data segment is equal to the portion of the MAC address of the broadcast device.

2. The transmission system as claimed in claim 1, wherein the broadcast device does not accept a connection request;
    wherein the connection request is CONNECT_REQ defined in the specification of Bluetooth Low Energy.

3. The transmission system as claimed in claim 1, wherein the broadcast data is the application of ADV_SCAN_IND defined in the specification of Bluetooth Low Energy, and the request data is the application of SCAN_REQ defined in the specification of Bluetooth Low Energy.

4. The transmission system as claimed in claim 1, wherein the first data segment of the request data causes the broadcast device to execute an operation action.

5. The transmission system as claimed in claim 1, wherein the second data segment of the request data determines parameters of an operation action.

6. The transmission system as claimed in claim 1, the content of the first address of the request data in order consists of the first data segment, the second data segment and the third data segment.

7. The transmission system as claimed in claim 6, wherein a bit number of the first address of the request data is equal to a bit number of the second address of the request data.

8. The transmission system as claimed in claim 7, wherein the first data segment and the second data segment of the first address have a first bit number, and the content of third data segment of the first address is equal to a portion of the content of the second address, wherein the portion of the content is equal to the content of the second address excluding the bits having the first bit number from the most significant bit.

9. The transmission system as claimed in claim 8, wherein the broadcast device determines whether to transmit the parameter data to the scanning device, comprising:
    transmitting the parameter data to the scanning device when the broadcast device determines that the content of the third data segment of the request data is equal to a first content of the second address, wherein the bit locations of the first content in the second address are equal to the bit locations of the third data segment in the first address.

\* \* \* \* \*